Nov. 7, 1967    R. V. ANDERSEN    3,350,792
AUDIO VISUAL TEACHING DEVICE
Filed April 23, 1965    2 Sheets-Sheet 1
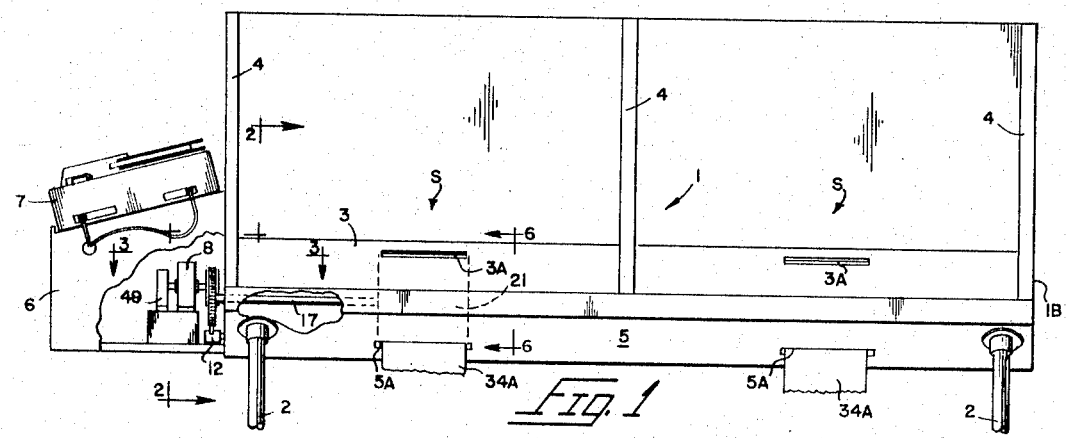
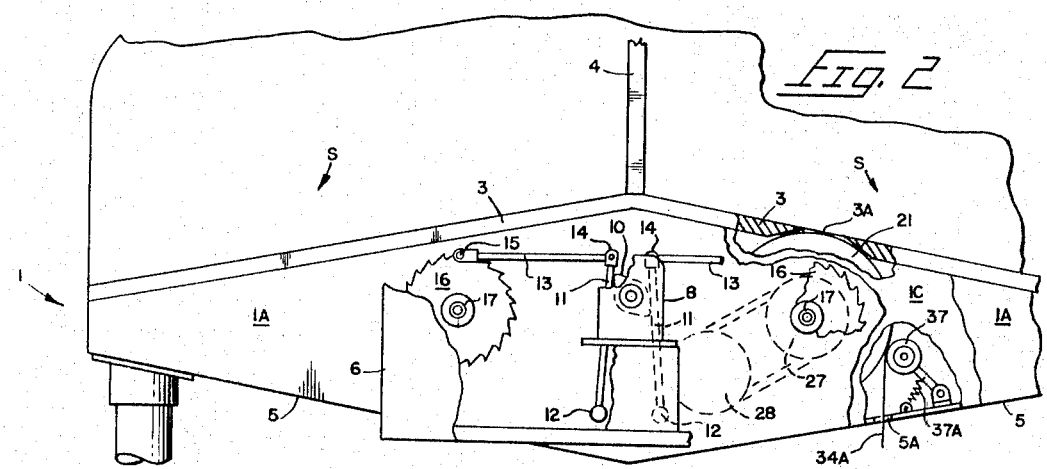
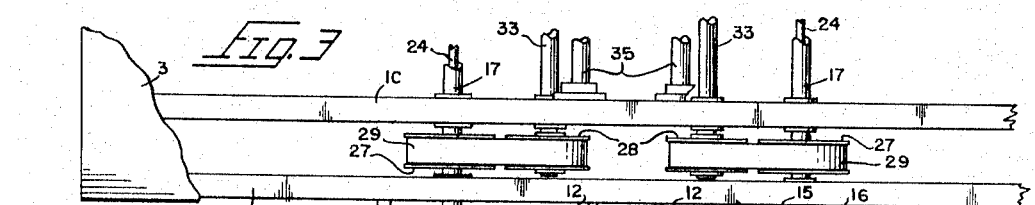
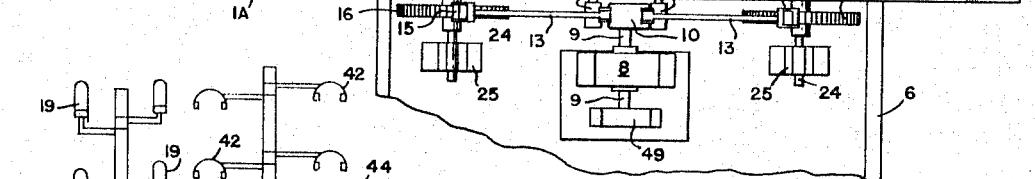
RALPH V. ANDERSEN
INVENTOR.

Nov. 7, 1967 R. V. ANDERSEN 3,350,792
AUDIO VISUAL TEACHING DEVICE
Filed April 23, 1965 2 Sheets-Sheet 2
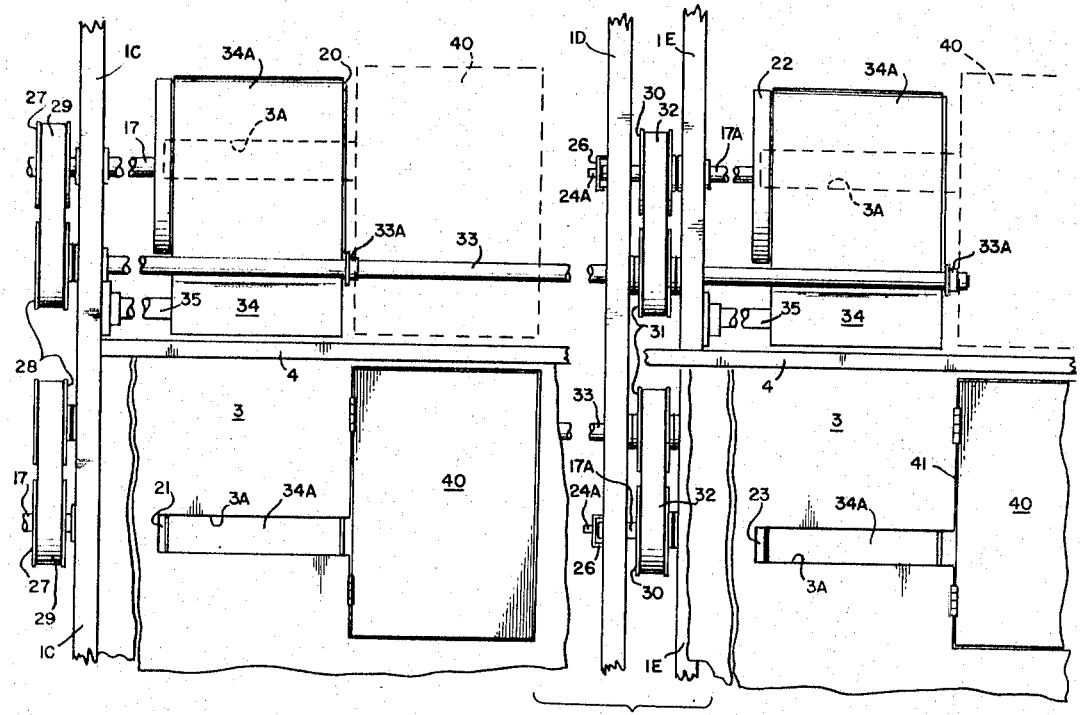
Fig. 4
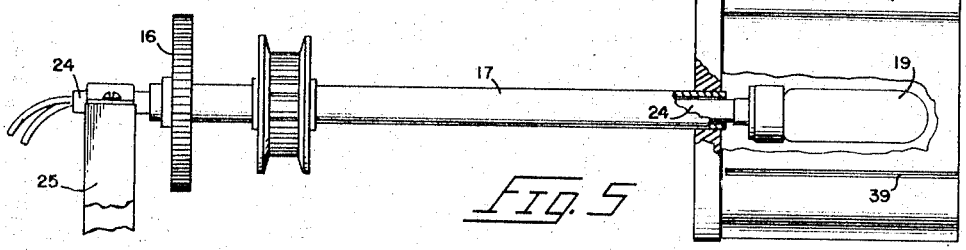
Fig. 5
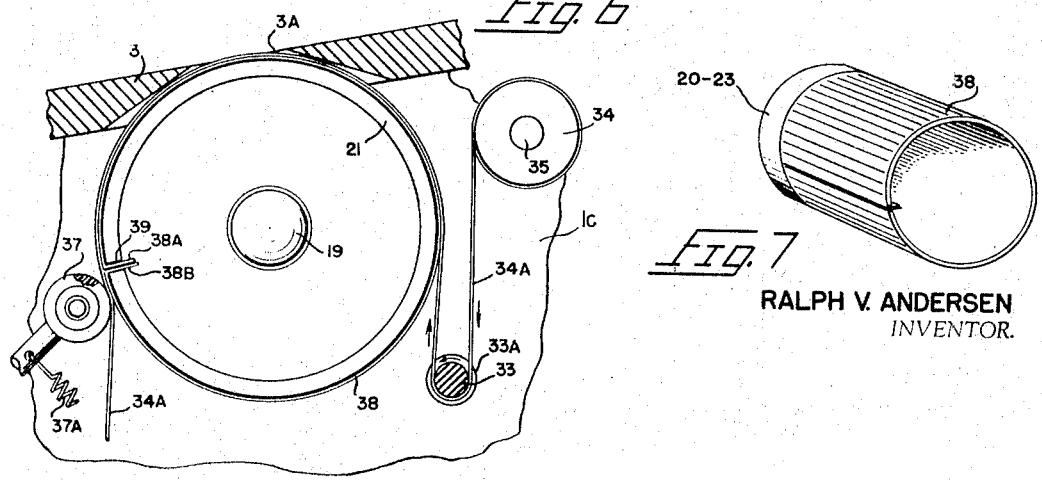
Fig. 6
Fig. 7
RALPH V. ANDERSEN
*INVENTOR.*

United States Patent Office 3,350,792
Patented Nov. 7, 1967

3,350,792
AUDIO VISUAL TEACHING DEVICE
Ralph V. Andersen, 200 SW. 138th Ave.,
Beaverton, Oreg. 97005
Filed Apr. 23, 1965, Ser. No. 450,442
7 Claims. (Cl. 35—8)

ABSTRACT OF THE DISCLOSURE

An educational device for presenting to a group of students the material to be learned in both a visual and aural manner. Programming means such as a tape recorder presents the material aurally and intermittently advances a visual display carried by an illuminated rotatable drum. Writing paper for the student may be entrained over the rotatable drum permitting development of writing skills.

---

This invention relates generally to educational devices and more particularly to a teaching apparatus which presents material to the student in both an aural and visual manner while simultaneously providing means for the student to manually trace the visual presentation of the material.

An important feature of this invention are the co-operating means provided for developing the student's kinesthetic senses while concurrently imparting a visual and aural impression of the subject matter to render to the student the benefit of the well-known principle that utilization of more than one teaching medium reduces the learning span.

Another important object of this teaching device is the provision of a relatively simple and inexpensive machine which is readily adaptable to the teaching of large or small groups of children and hence practical for use in public school systems.

An equally important object is the provision of means which allows the classroom instructor to expeditiously change the programming of the device making it suitable for teaching different subjects in successive class periods. Each class lesson is provided on a sheet of inexpensive, flexible, transparent material which is easily positioned upon a translucent, rotatable drum operable in conjunction with a magnetic tape carrying a pre-recorded lesson.

The foregoing and other objects and advantages which will become subsequently apparent reside in the details of construction and operation as more fully hereinafter described and claimed, reference being had to the accompanying drawings forming a part hereof and in which:

FIGURE 1 is a side elevational view of the educational device with fragments broken away for purposes of illustration.

FIGURE 2 is a sectional and elevational view on an enlarged scale taken approximately along the line 2—2 of FIGURE 1.

FIGURE 3 is a sectional detail plan view also on an enlarged scale taken approximately along the line 3—3 of FIGURE 1.

FIGURE 4 is a fragmentary plan view of the educational device showing rotatable drums and drive means therefor.

FIGURE 5 is a view of a typical drum assembly showing internal drum-illuminating means.

FIGURE 6 is a sectional view on an enlarged scale taken approximately along line 6—6 of FIGURE 1.

FIGURE 7 is a perspective view of a drum and transparent sleeve carried thereby.

FIGURE 8 is a schematic view of electrical components of the educational device and a wiring diagram therefor.

With continuing reference to the drawings and particularly FIGURE 1 thereof, a table indicated generally at 1 is supported by floor-engaging legs as at 2, and comprises an upper surface 3 divided by partition walls 4 into four individual student stations indicated generally at S. The table surface 3 is preferably inclined toward its longitudinal centerline, as shown in FIGURE 2, to present a rectangular viewing slot or display area 3a at each station at a more advantageous angle to the student. The underside of table 1 is oppositely inclined as at 5 to form, along with end cross-members 1a and 1b, a closed housing for drum assemblies and drive means therefor. Slots 5a are formed in the bottom surface 5 of the table.

Carried by the table 1 at one end thereof is a box-like enclosure 6 supporting lesson programming means comprising a tape recorder indicated at 7 of the type commonly referred to as a two-track, monophonic recorder as hereinafter more fully specified.

Interior of the enclosure 6 is a gear reduction motor 8 whose output shaft 9 is provided with a cam 10. A pair of articulating rods 11 are swingably attached at their bottom ends to the end crossmember 1a by spring-hinge means 12 which maintain the rods in operational contact with the cam 10. Two identical push rods 13 are pivotally connected at their inner ends 14 to their respective articulating rods and terminate at their outer ends in pawls 15 each intermittently engageable with respective ratchet wheels 16 to thus provide a pair of ratchet drive assemblies.

As best shown in FIGURE 3, a pair of tubular drum-rotating shafts 17 are journaled through the crossmembers 1a and an adjacent crossmember 1c and carry at their outer ends the ratchet wheels 16. The opposite ends of shafts 17 are provided with translucent drums or cylinders 20 or 21 as shown in the assembly view of FIGURE 5.

A light bulb 19 is disposed within the drums 20 and 21 of FIGURE 4 and supported therin, as shown in FIGURE 5, by a stationary dielectric tubular member 24 extending the length of the shaft 17. A second pair of drums 22 and 23 are similarly provided with light bulbs 19 supported by dielectric tubular members 24a within shafts 17a which are journaled within a crossmember 1e. Brackets 25 and 26 secure tubular members 24 and 24a against rotation, as shown in FIGURES 3 and 4 respectively. If so desired, fluorescent lighting means (not shown) may be provided within the table 1 disassociated from the drums with satisfactory results.

Simultaneous, intermittent rotation is imparted to the two pairs of drums 20–23 by the ratchet drive assemblies turning shafts 17, a first pair of timing belt drives and a second pair of timing belt drives comprising respectively pulleys 27–28, belt 29 and pulleys 30–31, and belt 32. The pulleys 28 and 31 are carried by a pair of drive shafts 33 each of which is suitably journaled within the crossmembers 1c, 1d and 1e. As an alternative the timing belt drives may be dispensed with and drums 22 and 23 operated by a second pair of ratchet drive assemblies actuated by a cam carried by an extension of the motor shaft.

As best shown in FIGURE 6, the shafts 33 are provided with flanged collars 33a adjacent each of the drums which serve as guides for the under-run of a roll of writing paper 34 prior to its entrainment over the drum. It will be noted that the intermittent rotation of shafts 33 is in a counterclockwise direction and against the travel of the under-run paper tape 34a to somewhat retard its movement to insure proper tensioning of the paper over the drum. The rolls 34 of writing paper are carried by stationary stub shafts 35 extending from crossmembers 1c and 1e. Idler rollers 37 (FIGURES 2 and 6) are spring-biased by a coil spring 37a against the paper tape 34a resulting in a friction drive between the rotatable drum and the paper.

A transparent wrap-around sheet 38 (FIG. 7) with the lesson material or images printed thereon is removably carried by each durm and secured against relative movement by the upturned ends 38a and 38b of the sheet 38 extending through a narrow slot 39 extending lengthwise in the drum. Said ends of the sheet may, if desired, be provided with a gummed coating to enable preforming the sheet into a substantially cylindrical shape to facilitate placement upon the drum.

Hinged to the upper surface 3 of the table at each of the student stations S (FIG. 4) is an access door 40 for the opening 41 through which the sheets 38 are removed and replaced, as well as the rolls of writing paper 34 replenished from time to time. In open communication with the opening 41 is the viewing slot 3a which is occupied by an arcuate segment of the drum and the writing paper 34a entrained thereon.

The tape recorder designated at 7 (FIGS. 1 and 8) is of the type capable of transmitting electrical impulses triggered by a signal pre-recorded at selected intervals on the magnetic tape. One track of the two track recording tape carries the above mentioned signal for activating a pulse generator incorporated within the recorder while the remaining track of the tape carries in the normal manner a series of messages constituting the recorded aural part of the lesson. As shown in FIGURE 8, speakers in the form of headsets 42 are provided at each student station S and are in circuit as at 43–44 to the output circuit of the tape recorder 7. The aural presentation so provided is synchronized with the visible segment of the sheet 38 within slot 3a by means of the tape carried signal which momentarily energizes the motor 8 through wires 45–45a and 46–46a to initiate advancement of the drum preparatory to the following recorded portion of the lesson. Such momentary energization of the motor 8 closes a secondary motor circuit comprising conductors 47–46a and 48–45a and including a motor limit switch 49 which subsequently opens the secondary motor circuit after completion of one cycle of operation of the ratchet drive assembly by the cam 10.

In operation the recorder is loaded with a two-track tape with the pre-recorded lesson and signals. The flexible sheets 38 printed with a lesson corresponding to the recorded material are engaged with their respective drums. The student, as he views the material appearing in the slot 3a, will simultaneously be provided with an explanation of the display carried by the first track during which a period is provided for tracing by the student. As the tape progresses, the first signal, carried by the second track, encounters the head of the recorder which in turn momentarily energizes the pulse generator of the tape recorder to transmit an electrical impulse to the motor 8. Partial rotation of the motor shaft 9 by this electrical impulse closes the contacts within the limit switch which stay closed for approximately 180° rotation of the motor shaft whereupon the contacts will open to complete the one cycle of operation.

While I have shown a particular form of embodiment of my invention, I am aware that many minor changes therein will readily suggest themselves to others skilled in the art without departing from the spirit and scope of the invention. Having thus described my invention, what I claim as new and desire to protect by Letters Patent is:

1. A teaching device for simultaneously providing different aural and visual impressions to a student in a successive manner comprising,
   a table-like structure having a plurality of student stations each having a display area associated therewith,
   rotatable drums carried by said structure subjacent said display areas,
   drive means for actuating said drums including an electric motor,
   lesson-programming means carried by said structure and capable of momentarily energizing said motor and of energizing speaker means,
   speaker means in circuit with said lesson programming means, and
   indicia bearing means removably carried by said drums.

2. A teaching device as claimed in claim 1 including illuminating means disposed within said drums.

3. A teaching device as claimed in claim 1 including a supply of writing paper with portions thereof entrained over said drums, and
   resilient means in bearing contact upon said portions of paper to urge said portions against said drums to thereby provide a friction drive for transporting said writing paper.

4. A teaching device for simultaneously providing different aural and visual impressions to a student in a successive manner comprising,
   a table-like structure having a plurality of student stations each defining a viewing slot within the structure,
   rotatable drums journalled within said structure subjacent said slots and having a segment occupying said slot,
   illuminating means disposed within said structure,
   indicia bearing sheets removably carried by said drums,
   drive means carried by said structure for simultaneously and intermittently rotating said drums including an electric motor,
   a tape recorder of the two-track type capable of reproducing both message signals and periodic electrical impulses to said motor,
   speaker means in circuit with said tape recorder to receive message signals.

5. The teaching device as claimed in claim 4 including means for transporting paper tapes over said drums comprising biased idler rollers in bearing contact upon said tapes and said drums.

6. The teaching device as claimed in claim 4 wherein said drive means comprises a plurality of ratchet drive assemblies and flexible power transmission means.

7. A teaching device for simultaneously providing aural and visual impressions to a student in a successive manner including,
   a table-like structure having a plurality of student stations and display areas associated therewith,
   illuminated display means rotatably mounted within said structure subjacent said display areas,
   drive means for intermittently actuating said display means including an electric motor,
   lesson programming means carried by said structure capable of momentarily energizing said motor and speaker means,
   speaker means in circuit with said lesson programming means, and
   a supply of writing paper carried by said structure and a portion of said paper entrained over said illuminated display means whereby an image carried by the latter will be traceable by a student.

References Cited

UNITED STATES PATENTS

| | | | |
|---|---|---|---|
| 2,954,546 | 9/1960 | Burns et al. | 242—75 X |
| 3,126,646 | 3/1964 | Penraat et al. | 35—9 |
| 3,162,959 | 12/1964 | Woolman | 35—9 |
| 3,181,253 | 5/1965 | Candreva et al. | 35—60 |
| 3,250,021 | 5/1966 | Screven | 35—9 |

EUGENE R. CAPOZIO, *Primary Examiner.*

W. GRIEB, *Assistant Examiner.*